US010821786B1

(12) United States Patent
Roberts et al.

(10) Patent No.: US 10,821,786 B1
(45) Date of Patent: Nov. 3, 2020

(54) RUN-FLAT TIRE INSERT (71) Applicants: Richard W. Roberts, Tecumseh, MI (US); John E. Nemazi, Bloomfiled Hills, MI (US)

(72) Inventors: Richard W. Roberts, Tecumseh, MI (US); John E. Nemazi, Bloomfiled Hills, MI (US)

(*) Notice: Subject to any disclaimer, the term of this patent is extended or adjusted under 35 U.S.C. 154(b) by 0 days.

(21) Appl. No.: 16/436,514

(22) Filed: Jun. 10, 2019

(51) Int. Cl.
| B60C 17/04 | (2006.01) |
| B60C 17/06 | (2006.01) |
| B29C 33/40 | (2006.01) |
| B29C 33/00 | (2006.01) |
| B60C 5/00 | (2006.01) |

(52) U.S. Cl.
CPC ........ *B60C 17/065* (2013.01); *B29C 33/0022* (2013.01); *B29C 33/40* (2013.01); *B60C 5/002* (2013.01)

(58) Field of Classification Search
CPC ......... B60C 17/00; B60C 17/04; B60C 17/06; B60C 17/061; B60C 5/002
See application file for complete search history.

(56) References Cited

U.S. PATENT DOCUMENTS

| 3,022,810 | A | | 2/1962 | Lambe | |
| 3,665,388 | A | * | 5/1972 | Johnsen | ............... B60C 23/0422 |
| | | | | | 340/443 |
| 4,003,419 | A | * | 1/1977 | Verdier | .................... B60O 5/00 |
| | | | | | 152/312 |
| 4,596,833 | A | * | 6/1986 | Endo | ...................... C08J 9/0038 |
| | | | | | 521/143 |
| 5,073,444 | A | | 12/1991 | Shanelec | |
| 6,170,545 | B1 | | 1/2001 | Kobayashi et al. | |
| 7,387,143 | B2 | | 6/2008 | Sandstrom | |
| 7,984,736 | B1 | | 7/2011 | Shoner | |
| 8,746,302 | B2 | | 6/2014 | Sachdev et al. | |
| 9,079,458 | B2 | | 7/2015 | Sanford, Jr. | |
| 10,207,606 | B2 | | 2/2019 | Roberts | |
| 2004/0159385 | A1 | * | 8/2004 | Rhyne | ...................... B60C 7/18 |
| | | | | | 152/197 |
| 2007/0000586 | A1 | | 1/2007 | Tramond et al. | |
| 2007/0215266 | A1 | | 9/2007 | Shimizu et al. | |
| 2008/0073017 | A1 | | 3/2008 | Fayol et al. | |
| 2012/0247634 | A1 | | 10/2012 | Liao et al. | |
| 2016/0167454 | A1 | | 6/2016 | He | |

(Continued)

FOREIGN PATENT DOCUMENTS

| CN | 104149556 A | | 11/2014 |
| GB | 1001974 | * | 8/1965 |
| GB | 2160482 A1 | | 12/1985 |

(Continued)

*Primary Examiner* — Justin R Fischer
(74) *Attorney, Agent, or Firm* — Brooks Kushman P.C.

(57) ABSTRACT

A run-flat tire insert for installation in a pneumatic tire mounted on a rim. The insert is a one-piece toroidal member formed from expanded polymer foam beads molded into a structural foam part. The insert has an inner diameter surface sized to fit snuggly about a periphery of a tire rim and an outer diameter sized to fit within a tire cavity. The insert is spaced from the tire inner casing surface during normal operation and supports the tire inner casing surface away from the rim in the event of a flat tire. A molding apparatus and a method of forming a run-flat tire insert is also disclosed.

21 Claims, 9 Drawing Sheets

(56) References Cited

U.S. PATENT DOCUMENTS

2016/0229149 A1    8/2016   Roberts

FOREIGN PATENT DOCUMENTS

| | | |
|---|---|---|
| JP | 2000043520 A | 2/2000 |
| JP | 2002067635 A | 3/2002 |
| JP | 2004291725 A | 10/2004 |
| JP | 2008296748 A | 12/2008 |
| JP | 2008296749 A | 12/2008 |
| TW | M498682 U | 4/2015 |
| WO | 18003835 A1 | 1/2018 |

* cited by examiner

RUN-FLAT TIRE INSERT

TECHNICAL FIELD

This disclosure related to run-flat tire inserts, a method and apparatus for forming run-flat tire inserts, and to a wheel and tire assembly including a run-flat tire insert.

BACKGROUND

Having a flat tire in vehicle having a pneumatic tire has been a problem for well over 100 years. During this time period, there have been numerous attempts to make a commercially feasible run-flat tire, which has not unreasonably increased cost, time performance, or vehicle weight. Prior art of flat tires includes small diameter solid rubber tires mounted within the pneumatic tire cavity to support the tire temporarily and protect the rim from damage until the vehicle can drive safely until the stop and travel a short distance. Others have attempted to build structure into the tire side wall to prevent a tire collapse in the event of a puncture. But the attempts to fill the interior cavity of the pneumatic tire with foam have adversely affected the tire rolling resistance and tire operating temperature. The object of run-flat tires is to provide the tire which can allow the vehicle to safely decelerate and leave the road way in the event of a puncture without causing a total loss of tire pressure. Preferably the tire will allow the vehicle to drive a limited distance at low speed to reach a service station or the intended destination. A flat tire insert is intended to minimize the rim and damage in the event of a tire failure while adding minimum weight and rolling resistance which adversely effects the tire operating temperature. Of course, the benefits must be provided at a reasonable cost in order to be commercially adopted.

The run-flat tire insert has a similar structure as the foam core found in the structural article disclosed in U.S. Pat. No. 10,207,606 which is incorporated b reference in its entirety. U.S. Pat. No. 10,207,606 also discloses suitable bead materials and an apparatus and method for molding expanded polyolefin beads into a structural article.

SUMMARY

A run-flat tire insert is disclosed for installation in a pneumatic tire mounted on a rim of a wheel. The insert is in the form of a toroidal member made from expanded polymer foam beads which are molded into a structural foam part. The run-flat tire insert has an inner diameter surface sized to fit about a periphery of a wheel rim and an outer diameter sized to fit within a tire cavity spaced from an inner casing surface of the tire. The toroidal member of a preferred embodiment has formed therein a plurality of circumferentially spaced apart radially extending passageways extending through the toroidal member to communicate with a circumferentially extending grove formed on the toroidal member inner diameter surface which is connected to an air inlet-outlet formed in the tire rim.

In at least one embodiment, a run-flat tire insert is provided for installation in a pneumatic tire mounted on a rim. The insert is a one-piece toroidal member formed from expanded polymer foam beads molded into a structural foam part. The insert has an inner diameter surface sized to fit snuggly about a periphery of a tire rim and an outer diameter sized to fit within a tire cavity and spaced from an inner casing surface of the tire.

A wheel and tire assembly having the above run-flat tire insert therein is also described. Additionally, two apparatuses for molding a one-piece toroidal a run-flat tire insert member formed from expanded polymer foam beads are disclosed.

In one run-flat tire insert embodiment the toroidal member has formed therein a plurality of circumferentially spaced apart radially extending passageways extending through the toroidal. These passageways communicate with a circumferentially extending grove formed on the toroidal member inner diameter surface which communicates with an air inlet-outlet formed in the tire rim. The run-flat tire insert has radially extending passageways are oriented perpendicular to an axial centerline of the toroidal member which are circumferentially spaced apart. There are at least three radially extending passageways and preferably 6 to 8 depending on wheel diameter.

The run-flat tire insert preferably has two axially spaced apart circumferentially extending groves on the inner diameter surface and is further provided with a plurality of axially extending groves which connect the circumferentially extending groves to the radially extending passageways.

The one-piece toroidal member in one embodiment is formed from expanded polypropylene beads having a density of 5 to 20 lbs/ft$^3$. In an alternate embodiment the expanded polymer foam beads comprise multi-layer beads having core made of a homopolymer having a melting temperature at least 10° F. above the melting temperature of a polymeric outer shell of the beads. The core of the expanded polymer foam beads has a melting temperature of 310 to 330° F. While the shell is formed of a copolymer having a melting temperature of 270 to 295° F. In yet another alternate embodiment the expanded polymer foam beads comprise multi-layer beads having core made of a homopolymer having the same melting temperature as the polymeric outer shell of the beads. In this embodiment the core material is much stiffer than that of the shell in order to maintain spherical bead shape longer as the bead is heated and begins to melt.

An apparatus for forming a run-flat insert for a pneumatic tire mounted on a rim is disclosed. The apparatus has a 2-piece mold body defining an annular cavity sized to form a run-flat insert in the form of a toroidal member. The toroidal member is formed from expanded polymer foam beads molded into a structural foam part having an inner diameter surface sized to fit about a periphery of a tire rim. The toroidal member has an outer diameter sized to fit within a tire cavity and spaced from an outer casing surface of the tire.

A plurality of steam pins affixed to the 2-piece mold body spaced about the annular cavity. The steam pins are movable into and out of the annular cavity, so that all portions of the annular cavity are preferably within 12 inches of a steam pin so the beads are uniformly heated and subsequently cooled.

A bead fill nozzle is affixed to one piece of the 2-piece mold body providing a bead inlet, a bead outlet communicating with the annular cavity, and a bead fill valve movable between on open and a closed position to enable the annular cavity to be filled with pressurized expanded polymer foam beads. A manifold system is provided having at least a steam manifold, a pressurized air manifold, a vacuum manifold and a vent, each alternatively connected to the plurality of steam pins by controllable valves, with the steam pins are organized in at least two groups.

A controller cooperating with the wherein once the mold is closed, the fill valve opens with the steam pins extended and annular cavity is filled with expanded polymer foam beads, the fill valve then closes and steam is provided to one or more of the steam pins by a steam manifold while another group of steam pins are vented. This process is repeated as necessary until all of the expanded polymer foam beads are molded into a structural foam part. After molding, one or more of the steam pins are connected to a pressurized air manifold and one or more another steam pins are connected to the vacuum source for a period of time until the structural foam part has decompressed and cooled sufficiently to be removed from the mold.

In one embodiment the plurality of steam pins extend radially into the annular cavity. In an alternative embodiment the plurality of steam pins extend into the annular cavity parallel to a central axis of the annular cavity. In a third embodiment a steam chest is provided in which the 2-piece mold body is housed. The steam chest connected to a source of pressurized air and a source of vacuum and the 2-piece mold is vented allowing gas to pass through the annular cavity to the steam chest.

BRIEF DESCRIPTION OF THE DRAWINGS

FIG. 17 side view of a fourth run-flat tire insert embodiment
FIG. 18 a side view of the fourth run-flat tire insert of FIG. 17 installed in a tire mounted on a rim;
FIG. 20 is a fifth run-flat tire insert embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2:
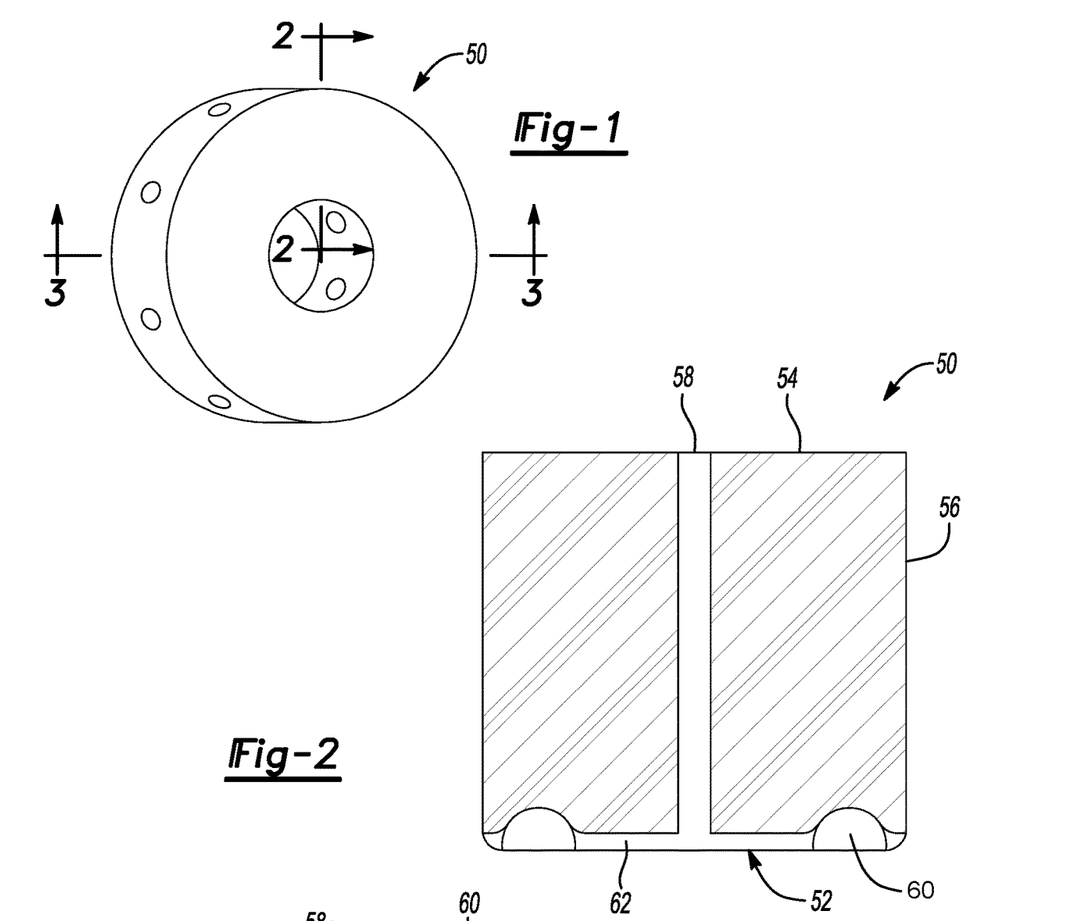
FIG. 1 is a perspective view of a first run-flat tire insert embodiment.
FIG. 2 is a cross section taken along line 2-2 in FIG. 1.

FIG. 1 illustrates a perspective view of a first embodiment of run-flat tire insert 50 which is generally a toroidal in shape and sized to fit within the interior cavity of a pneumatic tire mounted on a rim. The toroidal member illustrated is generally a rectangular in the cross section that is shown in FIG. 2 the insert. The insert is form of expanded polymer foam beads which is molded into a structural foam part having an inner diameter of 52 an outer diameter of 54, and a pair of spaced apart sidewalls 56. The inner diameter 52 is sized to snuggly fit about the tire rim. Preferably the inner diameter 52 is sized so that the toroidal shaped member is elastically stretched to fit about the rim.

The outer diameter surface 54 is sized to be spaced from the outer casing surface of the tire when the run-flat tire insert is installed in a tire mounted around a rim. The spacing is preferably 1 inch or more in a typical low-profile tire, or 25 percent of the distance between the tire rim and spaced apart casting inner surface. This spacing enables the tire to flex and with minimal contact between the outer diameter surface 52 of the insert 50 and the tire inner casing surface. This spacing minimizes any rolling resistance resulting from the flat tire insert and prevents the tire temperature from increasing. Further, physical properties of the polymer foam bead insert are not degraded as a result of repeated flexing.

Figure 3:
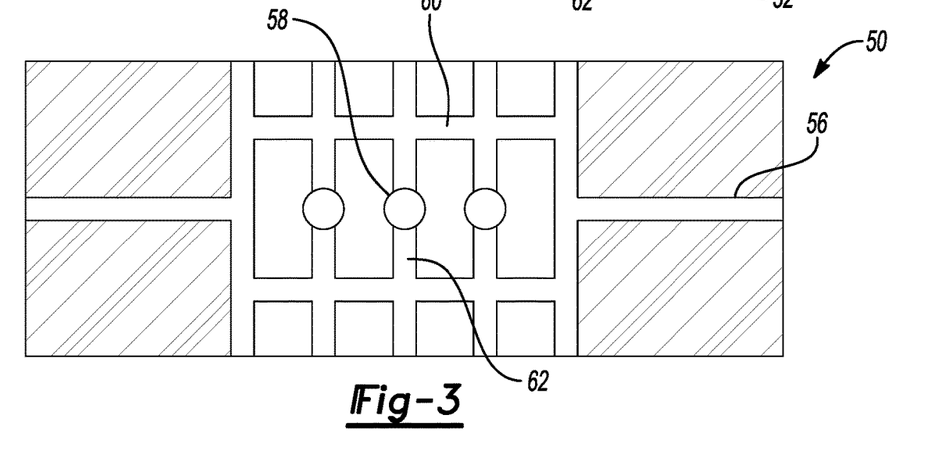
FIG. 3 is a cross section taken along line 3-3 in FIG. 1.

The first run-flat tire insert 50 illustrated has a plurality of radial extending passageway 58 which are circumferential spaced apart the outer diameter of the surface of 54. The radial passageways 58 extend substantially, through the illustrated embodiment, entirely through the run-flat insert 50. The inner diameter 52 of the tire insert 50 a series of air channel are provided which allow air to flow between the tire insert and the rim. Pair of the circumference extending the channels 58 extends about the inner diameter surface 52. Inboard of the side surface 56 a series of axial air channels, which extend parallel to the axis of the wheel, join radial passageways 56 to the circumferential extending passageways 60 as shown the FIGS. 2 and 3 cross sections of the tires. The circumferential extending channel 60 align with the valve stem 64 which is mounted in wheel rim 66 as illustrated in the FIG. 4 cross section view. Two circumferential channels 60 extend around tire insert inner diameter 52 enabling the insert to be installed in either orientation. Of course, a single circumference channel 60 could be used as insert installed in a specific side out orientation so that the circumferential channel aligned with the valve stem. The circumferential and axial channels 60 and 62 allow air to be introduced into the tire through valve stem 64 and released from the tire without having the insert obstructing the valve stem insert.

Figure 4:
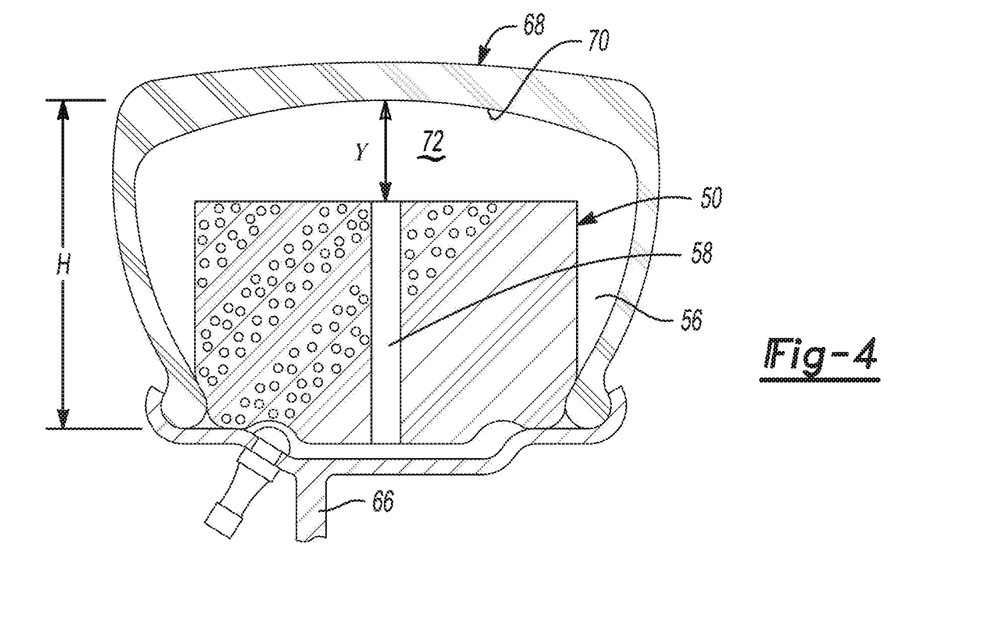
FIG. 4 is a cross section of a tire mounted on a rim having a first run-flat tire insert.

In the embodiment illustrated in FIG. 4, the tire 68 engages the run-flat tire insert 50 adjacent the bead of the rim 66. Over the remaining portion of the tire inner casing surface 70 the side wall 56 of insert 50 are spaced from the inter casing surface 70.

In FIG. 4 an assembled wheel is illustrated in cross section view illustrating the space "Y" between the outer diameter surface 54 of the run-flat tire insert 50 and inter casting 70 of tire. The distance the casting 70 is above the bead of the tire is illustrated as "H". A typical low-profile flat tire clearance Y could be as low as 1 inch in a fully inflated but uninstalled state. In higher profile tires, such as an off road or SUV tire applications, distance H is much greater, preferably spacing Y is at least 25% of H, to minimize the deflection of the run-flat tire insert 50 during normal use.

The inner diameter surface 52 of run-flat tire insert 50 preferable fits tightly around the rim of the wheel 66. In order to stretch the insert without damage it is preferable to warm the insert in a warming oven for at least 100 to 180 minutes at 100 to 200° F. to soften the insert and make it more pliable, Of course thicker inserts will require more preheating than inserts in low profile tire. Preferable the insert is heated to the desired temperature for a time sufficient heat the center of the insert section before placing the insert in the tire. The tire and insert is then installed on the wheel before the insert cools.

Figure 5:
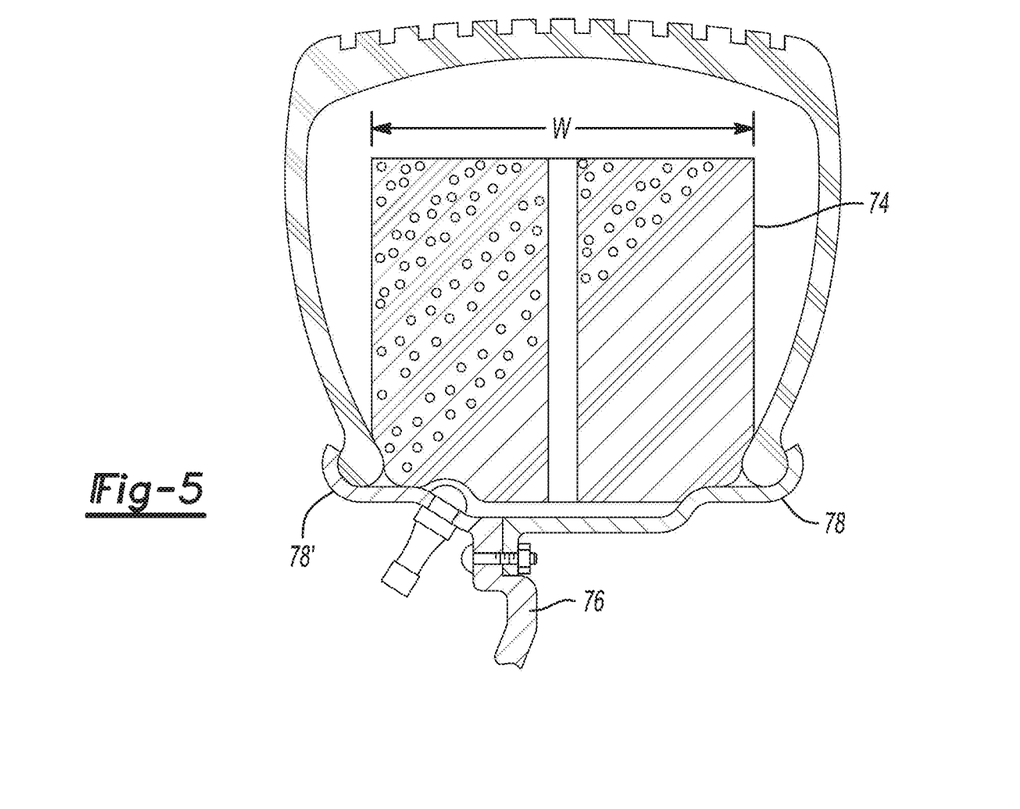
FIG. 5 is a cross section of a tire mounted on a rim having a first run-flat tire insert of mounted on a two-piece rim.

FIG. 5 illustrates a high profile of a flat tire insert 74 installed on a 2-piece wheel 76 having an inner 78 and outer 78' rim section which are connected together by a series of circumferentially spaced apart bolts. Alternatively, a 2-piece rim can be fabricated by a split ring and an outer rim flange as conventionally used in large over the road trucks. A 2-piece rim would allow installation of a much larger and thicker flat tire insert 74 than the one-piece illustrated in FIG. 5. The use of a run-flat tire insert would preclude the use of a standard truck tire inner tube making the seal in the conventional 2-piece rim problematic. With a 2-piece rim it may not be necessary to preheat the insert before installation on the wheel.

Run-flat tire inserts 50 and 74 are preferably made from an expanded polypropylene foam beads which is molded into a one-piece toroidal member. Of course other polymer foam beads can be used however an expanded polypropylene has excellent structural and cost characteristics and is available in a wide variety of foam densities to suit the specific vehicle application. Preferably in a typical mid-sized car application the polypropylene beads will have a density of 3 to 10 pounds per cubic feet. The density will vary depending on the expected load, the rim width and the tire profile.

An alternative material for fabricating a run-flat tire insert is a dual layer bead having a high melting transition temperature core and a relatively low melting temperature skin. The preferred dual layer bead has a homopolymer core having a melting temperature of 305 to 330° F. and a co-polymer skin having a melting temperature of 280-300° F. Preferably the melting temperature of the skin is at least 15° F. below the melting temperature of the core. The dual layer bead enables the core to have very high strength and a relatively low density. The low melting temperature of the skin enables the toroidal insert to be molded at temperatures below the melting temperature of the core. Accordingly, the steam passage ways between adjacent beads remain open longer allowing much lower steam pressures to be required when the steaming. a dual layer bead having a high melting temperature core.

Figures 6, 7:
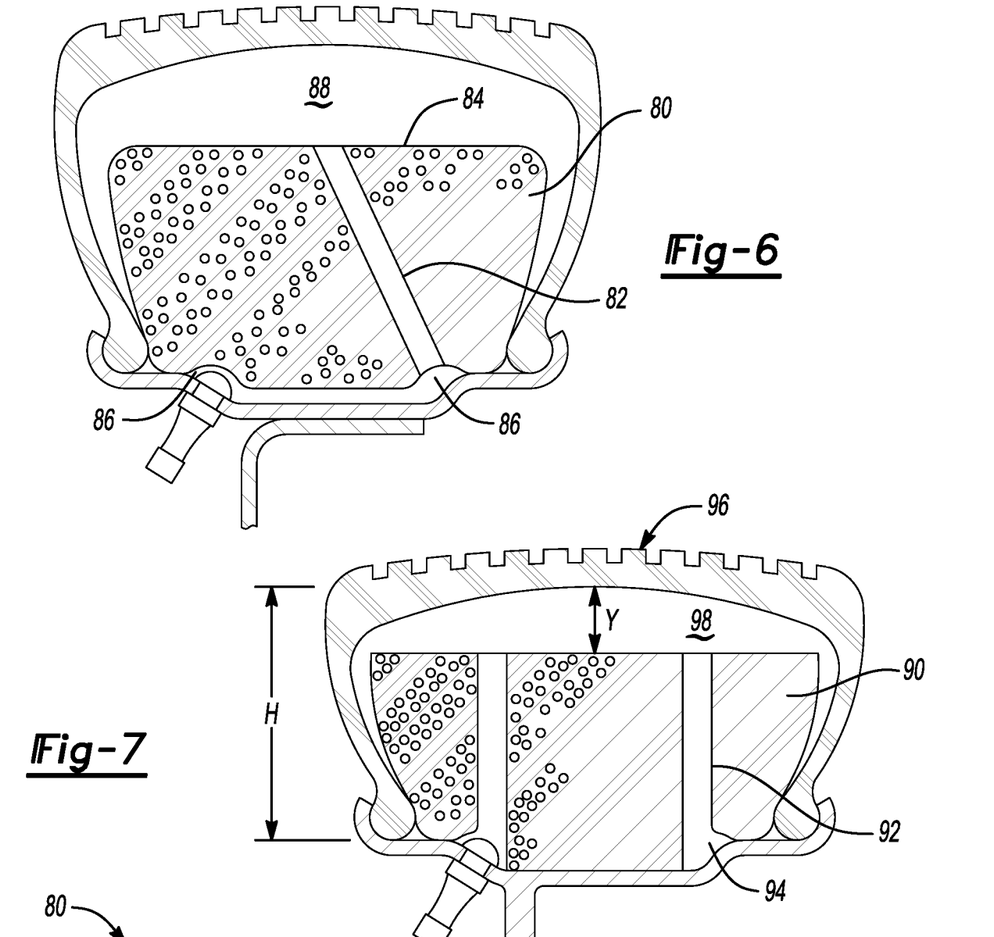
FIG. 6 is a cross section of a tire mounted on a rim having a second run-flat tire insert.
FIG. 7 is a cross section of a tire mounted on a rim having a third run-flat tire insert.

An alternative internal air passage structure is illustrated in the alternative embodiments shown in FIGS. 6 and 7. In FIG. 6, an insert 80 is shown having a radially outward extending air passage 82 which is inclined at an angle relative to a line perpendicular to the axis of the wheel is shown. Air passage 82 extends from the outer diametrical surface 84 of the insert inwardly to the circumferential groove 86. The orientation of the inclined radial extending air passage can alternate so both the inner and outer circumferential extending channels 86 will be connected to the internal cavity 88 enclosed by the tire.

In FIG. 7, yet another embodiment is shown where tire insert 90 is provided with two rows of radially extending passages 92 each aligned with a circumferentially extending channel 94. This structure is suitable for a low-profile tire 96 mounted on a very wide rim where a single centrally located radial passage might not adequately distribute the steam within the bead during the molding operation. The FIG. 7 embodiment of run-flat tire insert 90 substantially fills the width of the tire inner cavity 98 while radially gap Y between the outer diameter of insert 90 and the inner casing of the tire is maintained at a suitable level so that the insert is not deformed in the normal use. Preferably the gap Y is at least 1" or ¼ of the height H between the tire casing inner surface and the wheel rim.

Figure 8:
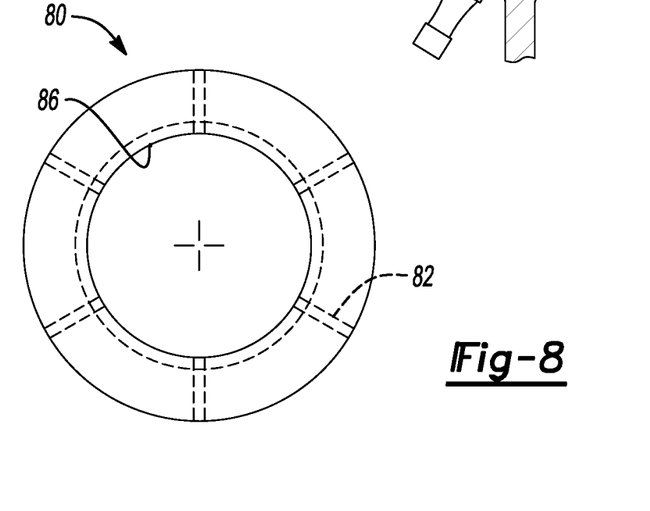
FIG. 8 side view of the second run-flat tire insert of FIG. 6.

In the side elevation of tire insert 80 shown in FIG. 8, six radially extending passages 82 are provided circumferentially spaced about the toroidal member. Preferably there are enough radial passages so that the bead is uniformly steamed during the molding operation. The number of radially extending passages formed by the steam pins will depend on tire size configuration. In FIG. 1, eight circumferential passages are provided. In the FIG. 7 embodiment, 16 or more radially passages might be necessary to adequately steam the bead.

Figure 9:
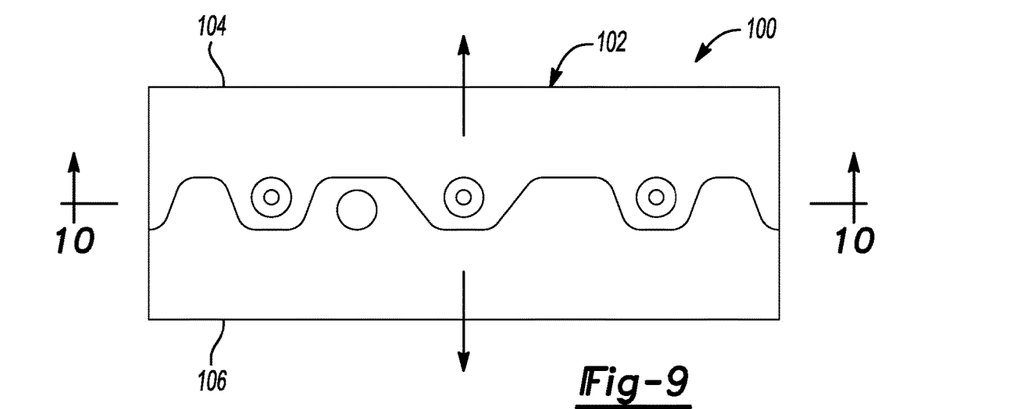
FIG. 9 is a top plan view of a mold assembly for making run-flat tire inserts.
Figure 10:
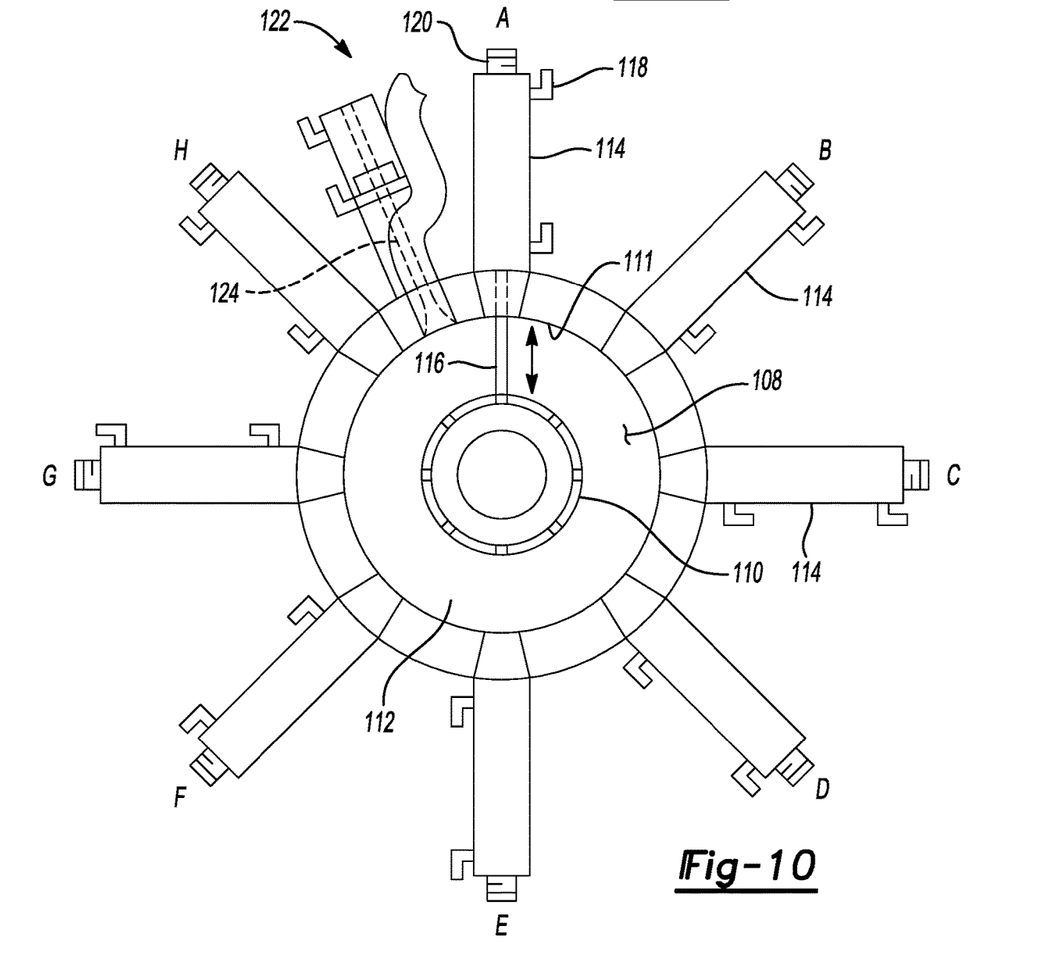
FIG. 10 is a side view of the mold assembly of FIG. 9.

FIGS. 9 and 10 illustrate a molding apparatus 100 for forming a run-flat tire insert for installation in a pneumatic tire which is mounted on a rim. The apparatus 100 has a 2-piece mold body 102 defining one mold cavity as illustrated in top plan view in FIG. 9. Two-piece mold body 102 comprises both halves of 104 and 106 shown in the mated state in FIG. 9. The mold halves are moved outward relative to one another to exposure an internal annular cavity 108 sized to form the run-flat tire insert. Each of the mold sections has a central hub 110, a circumferential outer wall 111, and a side wall surface 112. Each mold half may be an assembly of elements fastened together. Extending about the circumferential periphery of at least one of the mold sections are a plurality of steam pin units 114. In the embodiment illustrated, eight steam pin units—are provided each having a retractable steam pin which can be moved into and out of annular cavity 108. The steam pin units labeled A through H can be arranged in two or more groups.

During the steaming operation one set of steam pins are connected to a high-pressure steam source while the alternate set of steam pins are connected to a vent. The steam can be introduced into the bead at a high pressure and the inner annular cavity vented in a controlled manor to maintain the desired steaming operating pressure range. Typically, a pressure of 1 to 5 Bar, or about 15-72.5 PSI, is necessary to maintain a steam temperature sufficient to melt polypropylene in a timely manner. Each of the steam pin assemblies 114 is provided with a pair of fluid ports 118 for driving a piston within a cylinder to cause the steam pin 116 to advance or retract into the annular cavity 108. The steam pin assembly is each provided with an input/output port 120 through which steam can be introduced or exhausted and through which cooling air can be introduced or evacuated.

In order to make multiple size run-flat tire the 102 may be provided with removeable inserts. For example, the hub section of each mold half may have a removeable annular insert to accommodate different diameter wheel rims or to match the hub profile of various wheel manufactures. Alternatively, or in combination with hub inserts, each mold half of the 2-piece mold body could be provided with an insert which defines the outer diameter peripheral surface of the insert to accommodate tires with different sidewall heights. Additionally, one or both of the mold halves could be provided with annular spacer plate to vary the width of the run-flat tire insert.

In order to introduce expanded foam bead into the annular cavity 108 a bead filled gun 122 is provided in an upper region of the molding apparatus 100. The bead filled gun forms a fill port for introducing a bead into the annular cavity. The port is opened or closed by a pop-it valve 124 which is pneumatically operated. The pop-it valve opens and closes a bead fill passageway which is connected to a source of pressurized expanded foam bead. When the pop-it valve is opened, bead freely flows into the annular cavity. When the pop-it valve is closed, the cavity is sealed. In order to prevent bead from being entrapped between the pop-it valve and the corresponding valve seat of the pop-it valve is provided with a source of pressurized air to discharge bead from the area of the seat area in order to allow the valve to close. This structure is further described in reference to FIGS. 13A and 13B.

Figures 11, 12:
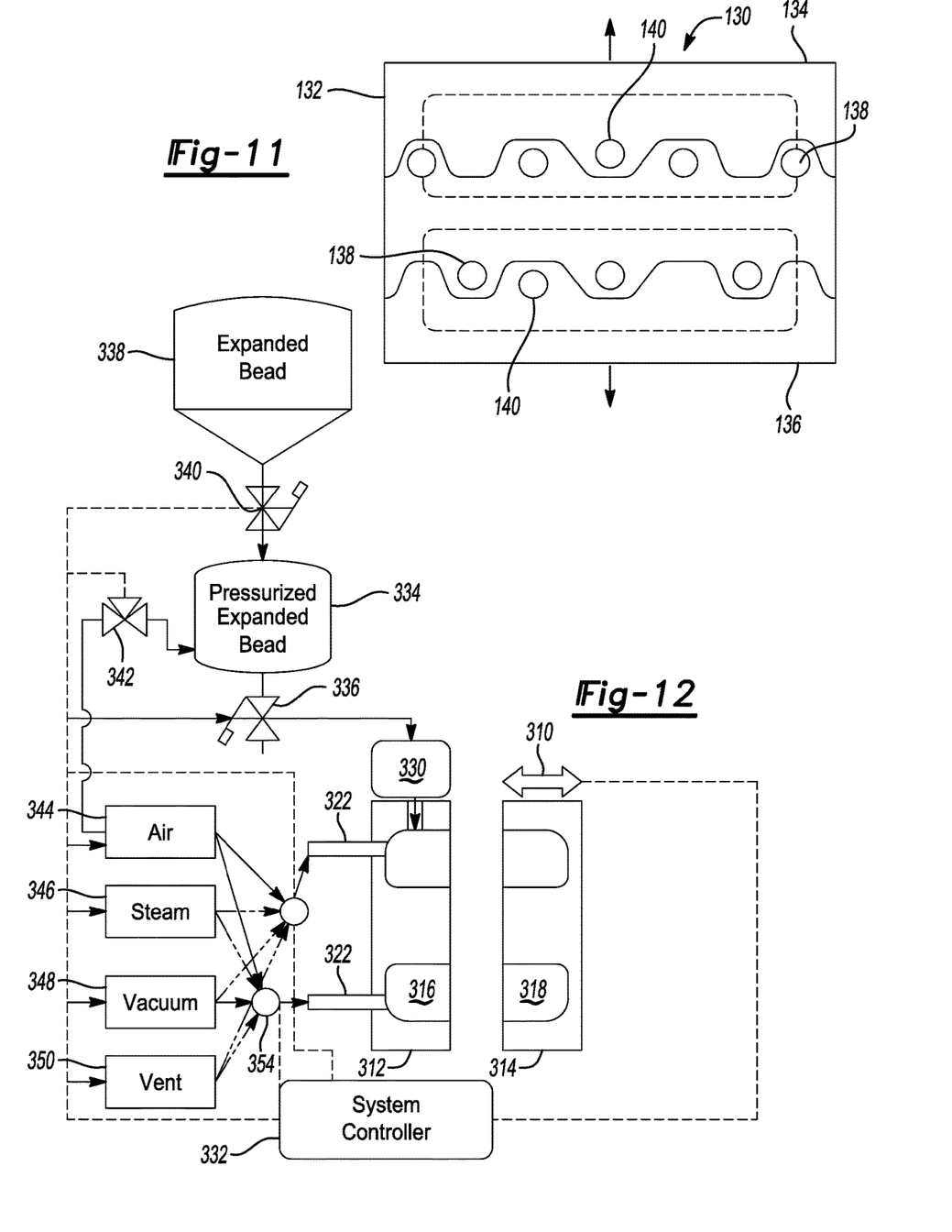
FIG. 11 is a top plan view of two cavity mold assembly for making run-flat tire inserts.
FIG. 12 is a schematic view of a manufacturing system for making run-flat tire inserts.

The molding apparatus 100 has a single angular cavity 108 and according makes one flat tire insert per mold cycle. FIG. 11 illustrates a three-part mold assembly 130 with two cavities capable of making two run-flat tire inserts per mold cycle. The three-part mold assembly 130 has a center mold section 132 an outer mold section 134 and an opposite outer mold section 136. Between mold section 132 and outer mold section 134 a first annular cavity is defined. Between the opposite side of mold section 132 and outer mold section 136 a second annular cavity is defined. Each annual cavity has a series of ports 138 for receiving steam pins and a fill port 140 for receiving a fill gun. As in the FIG. 10 embodiment, each mold half may be an assembly of elements fastened together. The mold sections can be provided with removable insert to make various size inserts from a set of mold tooling.

FIG. 12 illustrates a molding machine 300 having a mold molding machine controller 308 controls the operation of a mold actuator 310 capable of moving two mold halves 312 and 314 positioned on opposing lateral sides of the parting line and between an open position illustrated and a closed position to define an internal cavity formed by internal mold cavity halves 316 and 318. Mold halves 312 and 314 are specifically adapted for forming a foam bead article using the described methods. The mold halves are provided with a series of steam injector pins 320-328. Although only two steam pins are illustrated for simplicity purposes, the steam pins will be provided in an array having a sufficient number to thoroughly steam the product to be formed.

At least one of the mold halves will be provided with a bead fill gun 330 having a bead fill port which communicates with mold interior cavity portion 316. For simplicity purposes a single fill gun is illustrated, however, multiple filled guns at various locations can be provided as illustrated previously with respect to FIGS. 13A-13B. Preferably, at least one fill gun is located generally proximate the upper region of the mold cavity as illustrated in FIG. 12. Fill gun operation is controlled by a system controller 332. Preferably, the system controller 332 is a separate controller which communicates with the molding machine controller 308. In that way, the system can be added to existing molding systems. Alternatively, the system controller 332 can be incorporated into the molding machine controller for new machines or in reconstructed blow molding extrusion machines.

The bead fill gun 330 is supplied with expanded bead under pressure from tank 334 which is coupled to the fill gun 330 by an interconnecting supply line containing and valve 336 controlled by controller 332. The expanded bead is supplied to pressurized tank 334 from an expanded bead hopper 338 by a supply line containing a valve 340, again regulated by the system controller 332. The pressure of the expanded bead in tank 334 is maintained by a three-way pressure regulator valve 342 coupling the pressurized tank 334 to a source of pressurized air 344. The operation of the three-way pressure regulator valve 342 is controlled by the controller enabling the controller to pressurize the tank to the desired pressure, preferably, 30 to 120 pounds per square inch gauge pressure (PSIG) and to alternatively vent the tank 334 to atmosphere to facilitate the introduction of more bead into the tank.

The steam pins 320-328 can be alternatively connected to pressurized air source 344, steam source 346, a vacuum source 348 and a vent 350. To facilitate these alternative connections and to enable a number of steam pins to be associated together in zones, a steam pin manifolds 352 and 354 are provided. In the illustrate schematic, only two manifolds are shown for simplicity, however, preferably, up to ten and more preferably about 6 manifolds can be operated by the system controller. Each of the manifolds are connected to a series of steam pins and each manifold has an input/output connection to each of the air source, steam source, vacuum and vent 344, 346, 348 and 350. Each of the input/output connections is controlled by a flow valve operated by the system controller.

Figures 14, 15, 16:
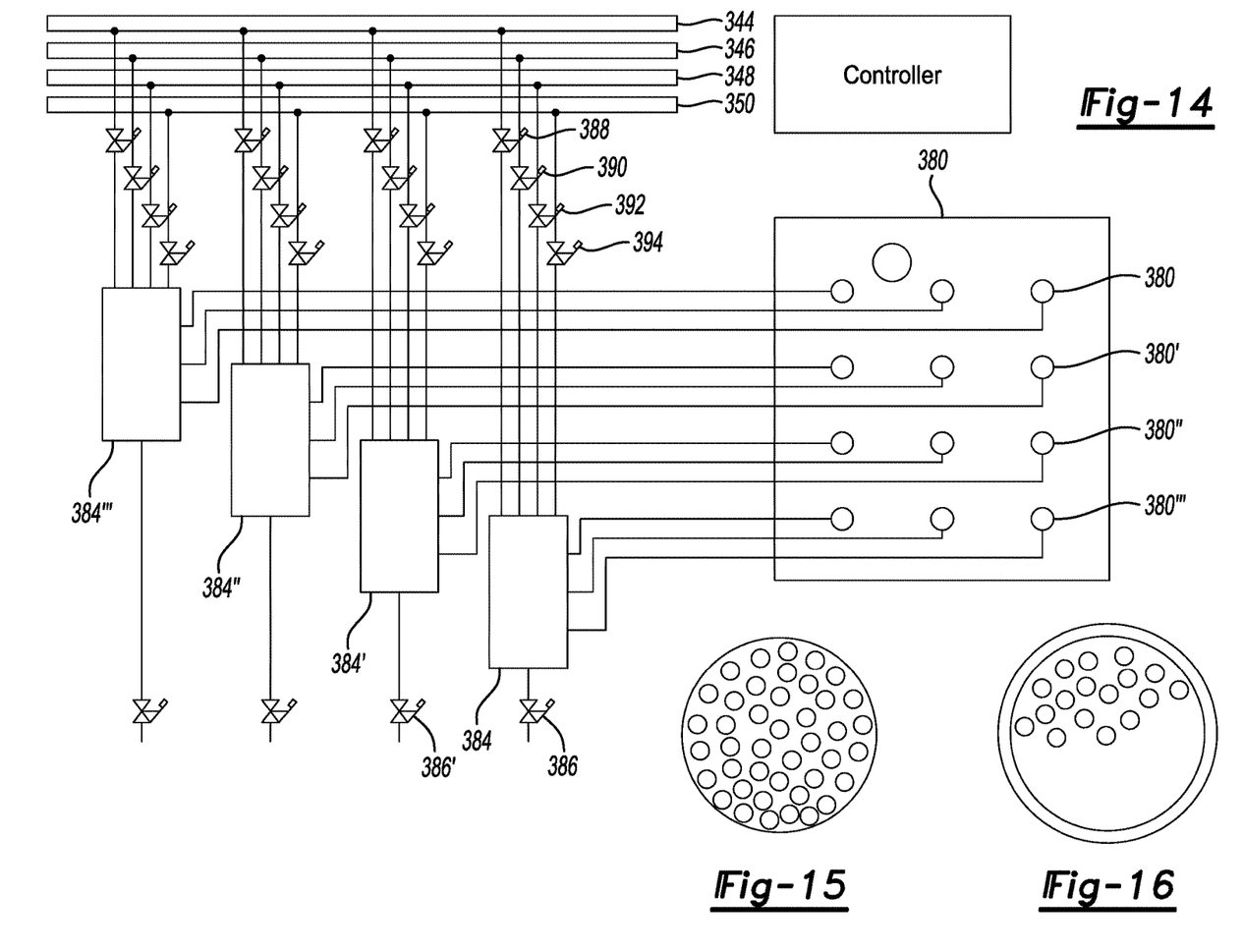
FIG. 14 is a schematic view of the steam pin and drive system for supplying air, steam, vacuum and a vent to the mold cavity.
FIG. 15 is a cross section of an expanded polymer foam bead.
FIG. 16 is a cross section of a two-layer expanded polymer foam bead.

In operation, with the mold shown in the open position, as illustrated in FIG. 14, Upon issuance of the closed mold signal, the system controller begins operation and temporarily takes over control of the molding machine. Immediately prior to or contemporaneously with the closing of the mold, Once the first actuated needle or needles 356 are extended into the cavity, the controller, opens the air valve supplying air to manifold 354 which in turn supplies air to needle 356 to blow air into the cavity until it reaches 15 to 80 PSIG. The controller extends all the needles from all of the steam pins project into the interior cavity. When the pressure nears the tank pressure, all of the steam pins will be closed accept the most remote steam pins from the fill gun which were main vented whereupon the control valve 336 will open and the fill gun mandrel will open allowing beads to flow from the pressurized tank 334 into the mold cavity in a controlled manner. The venting of the manifold associated with the remote steam pins will be controlled to maintain a desired part cavity pressure. When the pressure drops below that of the pressurized bead tanks 334, which is about 20-80 PSIG bead flows into the mold cavity. The pressure of the vented manifold is maintained approximately 2-5 PSIG below the fill tank pressure providing adequate pressure differential for the quick and orderly filling of the mold cavity with bead without forming voids.

Preferably once the distal region of the cavity is initially filled with beads, then the next set of steam pins is vented and the filling operation continues zone by zone until the final collection of steam pins proximate the fill gun is vented. Upon the achieving a substantially completely filled with beads, the fill gun closes as will be described in more detail. Subsequently, once closed, all of the steam vents are vented to atmosphere. Once vented to atmosphere, the beads further expand in size from their fill state and grow approximately 3-5% in volume as the pressure within the cavity cell drops from 25 PSIG to atmospheric pressure. This causes the beads to completely fill the cavity and to be slightly deformed as they contact one another.

Once the mold cavity is vented, the bead steaming process will begin one-half of the steam pins will be connected to a steam source while the other half of the steam pins will be connected to the vacuum source or alternatively, connected to atmosphere in systems operated without a vacuum source.

After a relatively short time period, 2 to 5 seconds, the initial steam pins provided with steam will be connected to the vacuum source and the remaining pins will be connected to the steam vent and the steam process will continue until the expanded beads are heated sufficiently to expand and melt together. Following the steam process the condensate removal and cooling step begins. One half of the steam pins will be connected to a source of pressurized air while the other half of the steam pins will be connected to a vacuum source or vented to atmosphere. Then, the pins originally connected to pressurized air will be connected to a vacuum source or vented to atmosphere, and the previously vented pins will be connected to a source of pressurized air. This step removes condensate from the bead steaming process from the expanded bead and causes the bead to be cooled. This process continues until the bead has reached the desired temperature, whereupon the steam pin needles are retracted and the mold halves opened so the run-flat tire insert can be de-molded. At this point, the controller passes control of the operation back to the molding machine controller so that the next part can be formed.

Figure 13A:
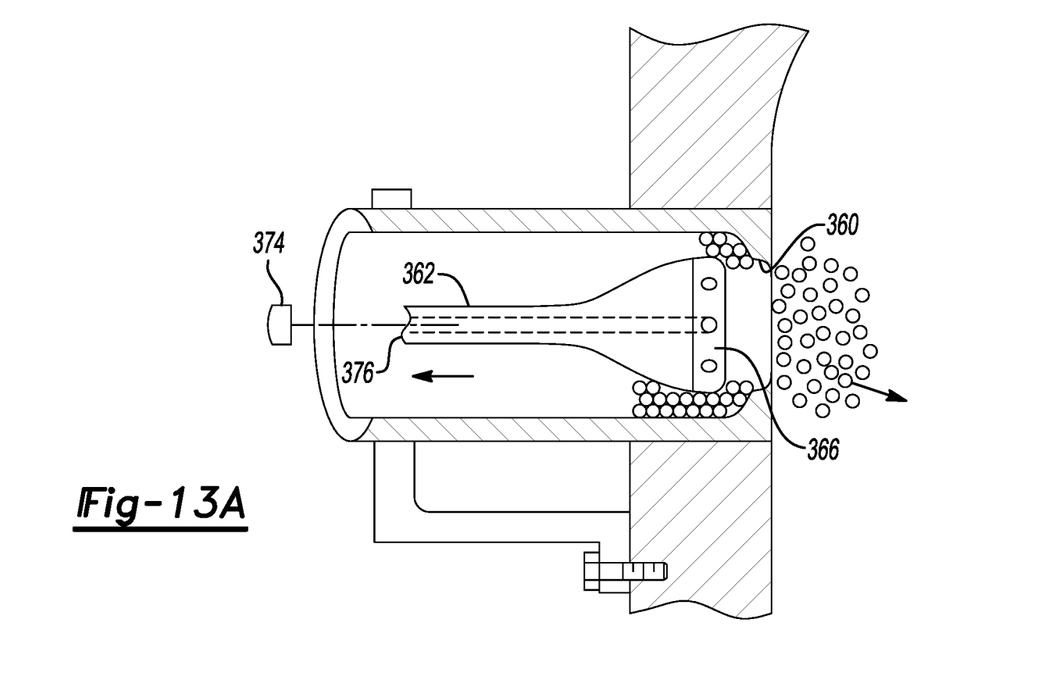
FIGS. 13A and 13B are view of a bead fill gun attached to a mold section.
Figure 13B:
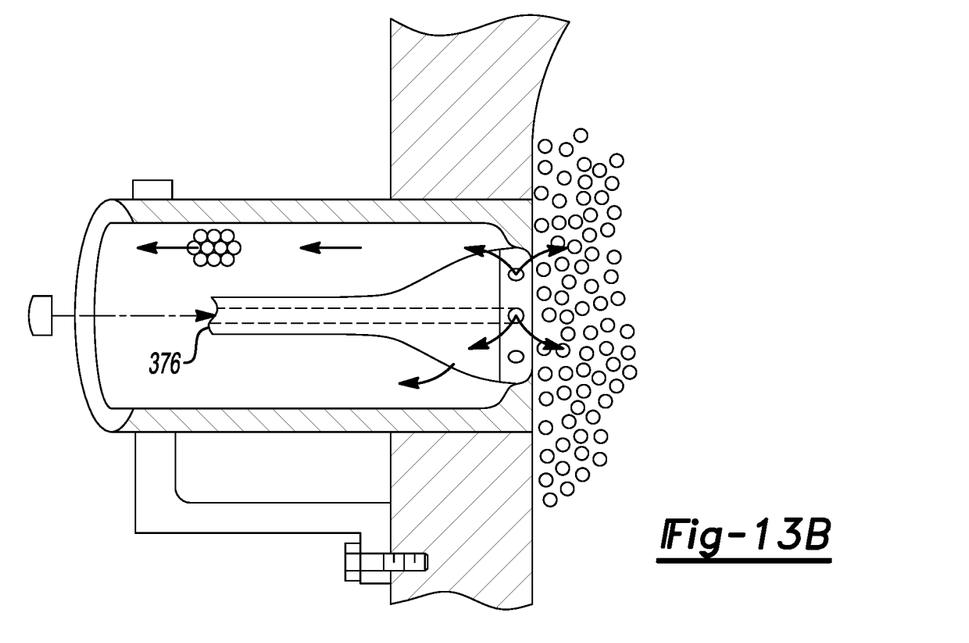

An enlarged schematic illustration of fill gun 330 is shown in FIGS. 13A-13B, illustrating various states of operation. In FIG. 13A the fill gun 330 is shown in the open position allowing bead to flow into the mold cavity. In FIG. 13B the fill gun is shown in the closed orientation. Blow gun 330 is installed in mold cavity half 312. The fill gun 330 has three main components; a fill tube 358 having a distal end flush with the mold cavity interior wall forming a fill aperture surrounded by frusto-conical valve seat 360. An elongate mandrel 362 has a distal end forming a face 364 conforming to the cavity wall when the mold halves are in the closed position and a frusto conical surface 366 which cooperates with frusto conical seat 360 of the fill tube 358 to form a tight seal when the mandrel is moved to the closed position as shown in FIG. 13B. When closed, mandrel 362 prevents beads from entering the cavity and the base of the mandrel 364 and the associated face of the distal end of the fill tube 358 conformed to the interior cavity wall of mold half 312.

With mold closed and pressurized, the bead filling process can begin. As shown in FIG. 13A, the mandrel 362 is retracted by a linear actuator 374 such as pneumatic or hydraulic cylinder or an electric linear actuator such as ball screw to cause the frusto conical face 366 to lift off of conical seat 360 allowing bead to flow into the interior of the mold cavity. The fill process continues until the mold cavity is completely filled as previously described.

In order to close the fill gun, it is necessary to remove the bead from the region of the conical seat 360 and the corresponding frusto conical face 366. To do so, As shown in FIG. 13B a tubular passage 376 allows air to be provided to a series of outlet ports in frusto conical face 366, the high pressure blast of air exiting these outlet ports, clears the bead allowing the mandrel to be closed. In order to enable the bead to be blow back out of the fill tube, optionally, the fill valve 336 can be maintained in the open position and the pressure in the tank 334 can be reduced enabling the bead to be pushed back through the fill gun and fill line into the pressure tank 334.

With the mold closed the fill process can begin. As shown in FIG. 13A, the mandrel 362 is retracted by a linear actuator 374 such as pneumatic or hydraulic cylinder or an electric linear actuator such as ball screw to cause the frusto conical face 366 to lift off conical seat 360 allowing bead to flow into the interior of the mold cavity. The fill process continues until the mold cavity is completely filled as previously described.

FIG. 14 illustrates a mold for an elongate part having a substantial width such as a structural panel. The mold 380 is provided with 12 steam pins 382 oriented in four rows of three with each row representing a zone connected to one of four manifolds 384, 384', 384" and 384"'. Each of the manifolds has an outlet which is preferably located at its lower most point connected to a controllable valve 336 which is regulated by the system controller 332. Each manifold has four inlets in the embodiment illustrated, connected to air source 334, steam source 346, vacuum source 348 and vent 350. As previously noted, it is possible to operate this system without a vacuum source utilizing the vent during the condensate removal process. The inlets in the manifolds are controlled independently by air valve 388, steam valve 390, vacuum valve 392 and vent 394, each operated by the system controller. The corresponding valves for each of the manifolds are also independently controlled by the system controller in the preferred embodiment. Accordingly, a great deal of flexibility in the control of the process is achievable.

One example of the process flexibility obtainable by the previously described structure is illustrated by the preferred steaming process. In order to minimize the amount of condensate introduced into the bead, prior to opening steam valve 346 to introduce steam into the manifold, the outlet valve 386 is opened allowing all of the condensate to drain from the manifold. When steam valve 390 is open, due to the relatively large size of the outlet opening in valve 386, steam will flow rapidly through the manifold and exit, removing any wet steam from the manifold and heating the manifold. Once hot the outlet valve 386 is rapidly closed causing steam to be injected into the bead through the associated steam pin needles. Each manifold is purged and preheated prior to each steaming operation, thereby maximizing the temperature and dryness of the steam introduced in order to heat the bead with the minimum amount of water, which in turn minimizes the amount of drying time necessary to remove the condensate.

Preferably, each of the steam pins is connected to a linear actuator to drive the steam pins in and out of the mold cavity. Preferably, the steam needle 382 is made of relatively thin wall stainless steel in order to have good corrosion resistance and low thermal mass.

FIG. 15 is a cross section of an expanded copolymer polyolefin bead 150. In at least one embodiment, the expanded polyolefin polymer beads includes expanded polypropylene polymer beads (EPP). In yet another embodiment, the bead includes expanded high molecular weight polypropylene polymer beads. In yet another embodiment, homopolymer beads are included in the expanded polyolefin beads in order to increase the stiffness of the run-flat tire insert. As a non-limiting example, when the homopolymer polyolefin is a homopolymer polypropylene, the stiffness increases such that 100,000 lb. load yields a 5.8 percent strain and a compression of 0.007 inches. In another example, the strain ranges from 2 percent strain to 10 percent strain. In at least one embodiment, EPP may be formed in situ by injection of steam into polypropylene beads to form steam-injected expanded polypropylene. It is understood that a portion of the run-flat tire insert may comprise polyolefin beads in a partially expanded configuration.

Steam-injected expanded polypropylene may have a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft³ to 6 lbs/ft³. In yet another embodiment, steam-injected EPP may have a density ranging from 3 lbs/ft³ to 5 lbs/ft³.

FIG. 16 is a cross section of a two-layer expanded polyolefin bead 160 having a high melting temperature core 162 and a relatively low melting temperature skin 164. The preferred dual layer bead has a homopolymer core having a melting temperature of 305 to 330° F. and a co-polymer skin having a melting temperature of 280 to 300° F. Preferably the melting temperature of the skin is at least 10° F. below the melting temperature of the core. Having two or more bead layers enables the core to have very high strength and a relatively low density. The low melting temperature of the skin enables the run-flat tire insert to be molded at temperatures below the melting temperature of the core. Accordingly, the steam passage ways between adjacent beads remain open allowing much lower steam pressures to be required when the steaming a dual layer bead having a high melting temperature core.

Figures 17, 18, 20:
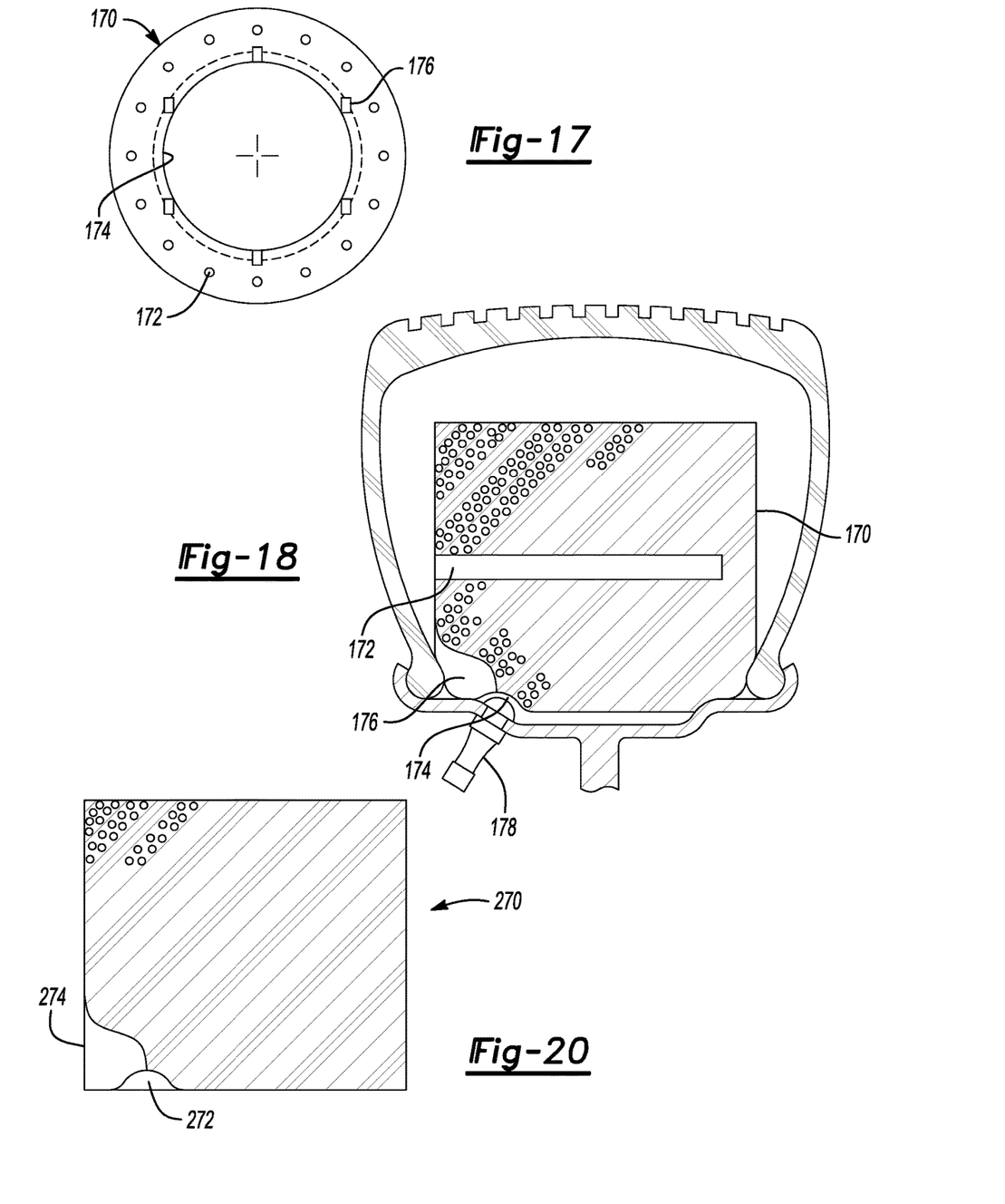

FIG. 17 is a side view an alternative run-flat tire insert 170 with the steam pins and the resulting passages 172 in the run-flat tire insert extending parallel to the mold axis. FIG. 18 illustrates a wheel and tire assembly with run-flat insert 170 installed therein. The run-flat tire insert 170 also has a circumferential groove 174 and a series of radial passages 176 extending between the circumferential groove 174 and the internal cavity 175 form between the tire and the rim. The valve stem 178 aligns with the circumferential grove 174 so that so that air can be introduced or removed from the internal cavity 175. The steam pins and the resulting steam passages 172 are placed sufficiently close together so that all of the bead can be uniformly heated during the steaming process. In this embodiment since the steam pins are parallel to the mold axis it may be possible to have fixed steam pins to reduce the mold cost. To facilitate removal of the run-flat tire insert the steam pins can be pressurized to assist in the removal process.

Figure 19:
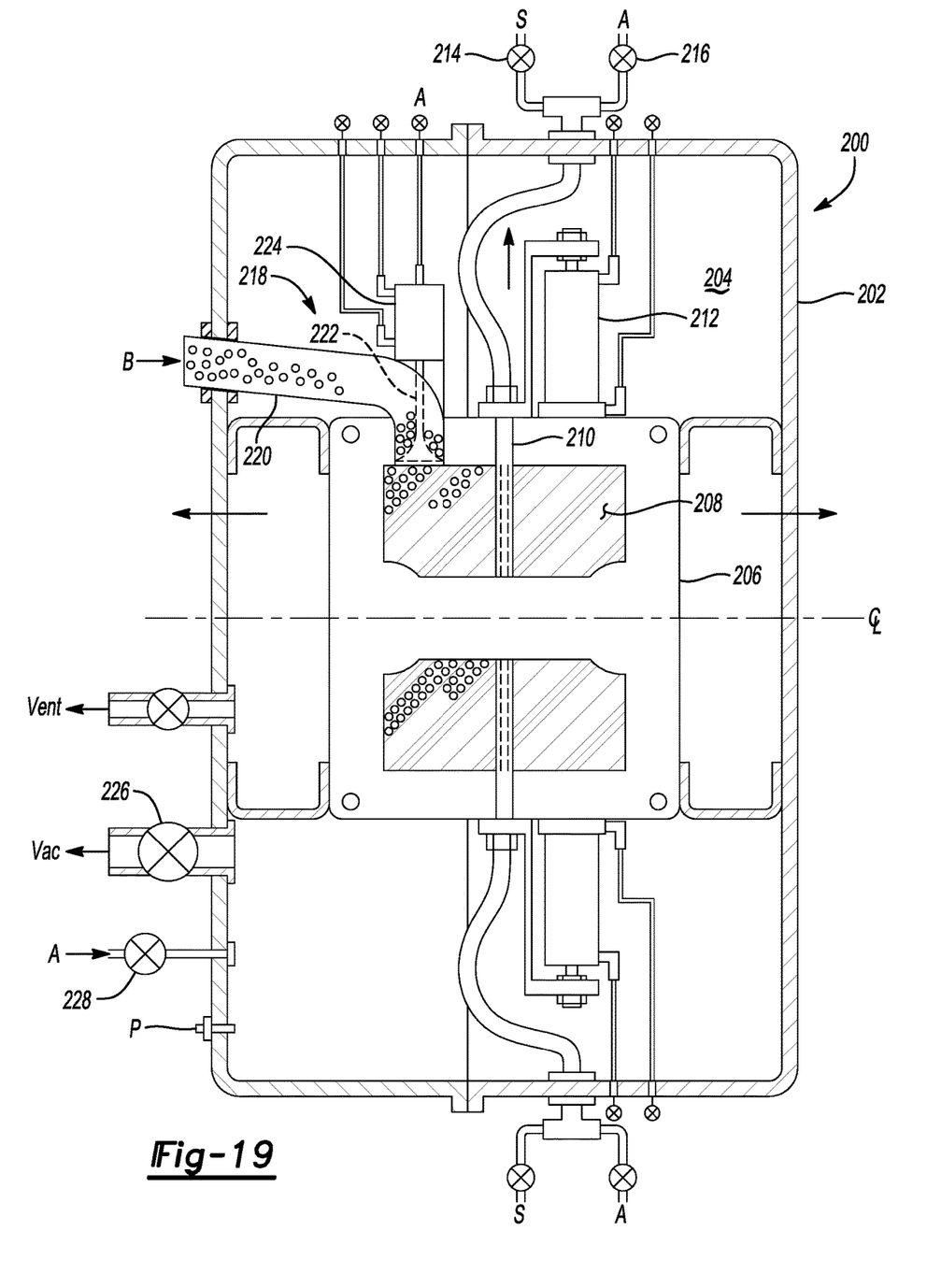
FIG. 19 steam chest type manufacturing system for making run-flat tire inserts.

FIG. 19 illustrates a steam chest type molding apparatus 200 designed to form run-flat tire inserts. The molding apparatus 200 consists of a two-piece steam chest 202 which defines an internal cavity 204. Within the cavity a steam chest mold 206 this positioned attached to the two sections of steam chest 202 defining a mold cavity 208 in which the run-flat tire insert can be molded. A series of steam pins 210 extend into the mold cavity 208 which are advanced and retracted radially to the centerline CL of mold cavity 208 by an actuator 212. Steam pins 210 can been alternatively connected to a source of steam S or a source of air A by servo valves 214 and 216. A fill gun assembly 218 located near the top of the mold provides a source of polymer foam beads to the mold cavity 208. The fill gun assembly 218 has an elongated port 220 with one end connected to a source of beads B and the other end opening into the mold cavity 208. a poppet valve 222 fits within the opening regulating the flow of bead like the valve shown FIGS. 13A and 13B.

During the filing operation the pressure in the steam cheat is maintained substantially above atmospheric pressure as described in the FIG. 10 embodiment. Filing the mold cavity 208 while the mold cavity 208 and the steam chest cavity 204 is pressurized enable more polymer foam bead to be introduced into the mold cavity before valve 222 closes and the steaming operation starts. the pressure on the steam chest cavity 204 is maintained by introducing air A through a port controlled by servo valve 226. the pressure is sensed using a pressure sensor 228 mounted in the wall of the steam chest 202. A system controller similar to controller 332 in FIG. 12 controls molding apparatus 200.

Unlike mold cavity 108 in the FIG. 10 embodiment, the surface of mold cavity 208 is vented to the steam chest cavity 204 in a manor conventional to steam chest molds. During the steaming operation the steam chest cavity 204 is connected to a source of vacuum V by servo valve 226. After the polymer beads are thoroughly steamed, air is provided to the steam pins and a vacuum source V is connected to the steam chest cavity 204 by servo valve 226 until the run-flat tire insert is adequately cooled and the condensed steam within the insert thoroughly evaporated.

In a variation on the above embodiment, the steam pins can be oriented parallel to the mold axis, makes it may possible to have fixed steam pins to reduce the mold cost. A run-flat tire insert of this construction is shown in FIG. 18. To facilitate removal of the run-flat tire insert from the mold, the steam pins can be pressurized to assist in the demolding process. A run-tire insert 170 shown in FIG. 18 could be made in a steam chest cavity with pins oriented parallel to the mold axis extending partially through the insert to facilitate removal with pressurized air.

FIG. 20 is a section view of a fifth embodiment of a run-flat tire inset 270. This embodiment, unlike run-flat tire inset 170, lacks radially or axial air passages extending into the run-flat tire inset. A circumferential grove 272 is formed on the inner diameter of the insert for cooperation with the valve stem insert. At least one small radial passage 274 connects the circumferential grove to the tire internal cavity to add or remove air from the tire. Run-flat tire inset 270 can be made in a standard steam chest molding equipment without the need for steam pins. This embodiment, which lacks passages extending air into the run-flat tire insert, is particularly suited for dual layer beads. Do to the porosity of the beads in the finished run-flat tire insert, steam is enabled flow through all of the beads to uniformly heated the beads within the mold without any unheated zones.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A run-flat tire insert for installation in a pneumatic tire mounted on a rim, the insert comprising:
a toroidal member formed from expanded polymer foam beads molded into a structural foam part having an inner diameter surface sized to fit about a periphery of a tire rim and an outer diameter sized to fit within a tire cavity and spaced from an outer casing surface of the tire,
wherein the toroidal member has formed therein a plurality of circumferentially spaced apart elongate passageways extending substantially into the toroidal member and are oriented parallel to an axial centerline of the toroidal member to provide passageways for steam to heat the expanded polymer foam beads molding them into a structural foam part, the toroidal member having an inner diameter surface which is sized to fit about a tire rim,
wherein a circumferentially extending groove is formed on the inner diameter surface providing an annular channel connectable to an air inlet-outlet formed in the tire rim, wherein the toroidal member inner diameter surface is further provided with a series of radially extending grooves formed in a side surface of the toroidal member forming an air passageway extending between the annular channel and an internal cavity within a pneumatic tire.

2. The run-flat tire insert of claim 1 wherein, all portions of the toroidal member are within 12 inches of an elongate passageway.

3. The run-flat tire insert of claim 1, wherein the plurality of circumferentially spaced apart elongate tubular passageways comprise at least three elongate tubular passageways.

4. The run-flat tire insert of claim 1, wherein the expanded polymer foam beads comprise expanded polypropylene beads having a density of 1-5 lbs/ft3.

5. The run-flat tire insert of claim 1, wherein the expanded polymer foam beads comprise expanded polypropylene beads having a density of 2.5-20 lbs/ft3.

6. The run-flat tire insert of claim 1, wherein the expanded polymer foam beads comprise a multi layer bead with the layers having different stiffness.

7. The run-flat tire insert of claim 1, wherein the expanded polymer foam beads have a melting temperature of 270-310° F.

8. The run-flat tire insert of claim 1, wherein the expanded polymer foam beads comprise a homopolymer having a melting temperature of 270 to 310° F.

9. A run-flat tire assembly comprising a pneumatic tire mounted on a rim defining an annular chamber, bound by the rim and a casing inner surface of the tire, in which the run-flat tire insert of claim 1 is installed,
wherein the run-flat tire insert outer diameter is radially spaced from the casing inner surface of the tire by 1-2 inches in an inflated unloaded state.

10. A run-flat tire assembly comprising a pneumatic tire having a casing inner surface mounted on a rim defining an annular chamber therebetween in which the run-flat tire insert of claim 1 is installed,
wherein the run-flat tire insert outer diameter is spaced from the outer casing surface of the tire by a distance Y which is equal to 10-30% of a maximum radial distance H which is the distance the casing inner surface is above the bead of the tire in an inflated unloaded state at the equatorial plane of the tire.

11. A run-flat tire assembly comprising a pneumatic tire having a casing inner surface mounted on a rim defining an annular chamber therebetween in which the run-flat tire insert of claim 1 is installed,
wherein the run-flat tire insert has axial spaced apart side surfaces defining an insert width W which is over 60-80% of a maximum spacing between opposed inner side wall surfaces of the tire casing inner surface in an inflated unloaded state.

12. A run-flat tire insert for installation in a pneumatic tire mounted on a rim, the insert comprising:
a toroidal member formed from expanded polymer foam beads molded into a structural foam part having an inner diameter surface sized to fit about a periphery of a tire rim and an outer diameter sized to fit within a tire cavity and spaced from an outer casing surface of the tire,
wherein the toroidal member has formed therein a plurality of circumferentially spaced apart elongate tubular passageways extending radially into the toroidal member to provide passageways for steam to heat the expanded polymer foam beads molding them into a structural foam part, the toroidal member having an inner diameter surface which is sized to fit about a tire rim,
wherein a pair of axially spaced apart circumferentially extending grooves are formed on the inner diameter surface providing channels connectable to an air inlet-outlet formed in the tire rim, and
wherein the toroidal member has an inner diameter surface that is further provided with a plurality of axially extending groves which connect with the circumferentially extending groves to the radially extending elongate tubular passageways.

13. The run-flat tire insert of claim 12, wherein the plurality of circumferentially spaced apart radially extending tubular passageways comprise at least three passageways.

14. The run-flat tire insert of claim 12, wherein the expanded polymer foam beads comprise expanded polypropylene beads having a density of 1-5 lbs/ft3.

15. The run-flat tire insert of claim 12, wherein the expanded polymer foam beads comprise expanded polypropylene beads having a density of 2.5-20 lbs/ft3.

16. The run-flat tire insert of claim 12, wherein the expanded polymer foam beads comprise a multi layer bead with the layers having different stiffness.

17. The run-flat tire insert of claim 12, wherein the expanded polymer foam beads have a melting temperature of 270-310° F.

18. The run-flat tire insert of claim 12, wherein the expanded polymer foam beads comprise a homopolymer having a melting temperature of 270 to 310° F.

19. A run-flat tire assembly comprising a pneumatic tire mounted on a rim defining an annular chamber in which the run-flat tire insert of claim 12 is installed,
wherein the run-flat tire insert has an outer diameter that is spaced from a casing inner surface of the tire by 1-2 inches in an inflated unloaded state.

20. A run-flat tire assembly comprising a pneumatic tire having a casing inner surface mounted on a rim defining an annular chamber therebetween in which the run-flat tire insert of claim 12 is installed,
wherein the run-flat tire insert outer diameter is radially spaced from the casing inner surface of the tire by a distance Y which is equal to 10-30% of a maximum distance distance H which is the distance the casing inner surface is above the bead of the tire in an inflated unloaded state at the equatorial plane of the tire.

21. A run-flat tire assembly comprising a pneumatic tire mounted on a rim defining an annular chamber therebetween in which the run-flat tire insert of claim 12 is installed,
wherein the run-flat tire insert has axial spaced apart side surfaces defining an insert width W which is over 60-80% of a maximum spacing between opposed side wall surfaces of the tire casing inner surface in an inflated unloaded state.

* * * * *